May 9, 1933.          L. M. BOOTH ET AL          1,907,721
FEEDING DEVICE FOR SOLID SUBSTANCES
Filed March 4, 1930          2 Sheets-Sheet 1

Levi Miller Booth
George Martin Booth
    INVENTORS
BY Henry M. Bingham
       their ATTORNEY.

May 9, 1933. L. M. BOOTH ET AL 1,907,721
FEEDING DEVICE FOR SOLID SUBSTANCES
Filed March 4, 1930  2 Sheets-Sheet 2

Lewis Miller Booth
George Martin Booth
INVENTORS

BY Henry M. Brigham
ATTORNEY.

Patented May 9, 1933

1,907,721

UNITED STATES PATENT OFFICE

LEVIS MILLER BOOTH AND GEORGE MARTIN BOOTH, OF PLAINFIELD, NEW JERSEY, ASSIGNORS TO WALLACE & TIERNAN COMPANY, INC., OF BELLEVILLE, NEW JERSEY, A CORPORATION OF NEW YORK

FEEDING DEVICE FOR SOLID SUBSTANCES

Application filed March 4, 1930. Serial No. 433,156.

This invention relates to the general subject of feeders, and has particular reference to an improved feeding device designed especially for the feeding of pulverized or other subdivided solid substances.

To this end, this invention contemplates a simple and practical construction which provides a hopper or container for the pulverized or other subdivided solid substances which are desired to be fed. Said hopper or container within itself provides sufficient agitation for the delivery of its contents therefrom in an even, steady flow, to and as required by a feeding and regulating device.

With the foregoing general object in view, and other more specific objects that will presently appear as the description of the case proceeds, the present invention consists in a novel construction, combination and arrangement of parts hereinafter more fully described, illustrated and claimed.

A feeder consists of two principal parts: First a hopper, in which the material to be fed is placed. Second, a device for feeding and regulating the flow from the hopper. Our invention has particular reference to the first of these parts—the hopper—which is intended to be used with the second, a feeding and regulating device.

Fundamentally, the apparatus consists of a hopper with mechanical means for varying the contour of said hopper to maintain its contents in a mobile condition for delivery therefrom to a feeding and regulating member. Preferred and practical embodiments of the invention are described in the apparatus illustrated in the accompanying drawings in which.

Figure 1:
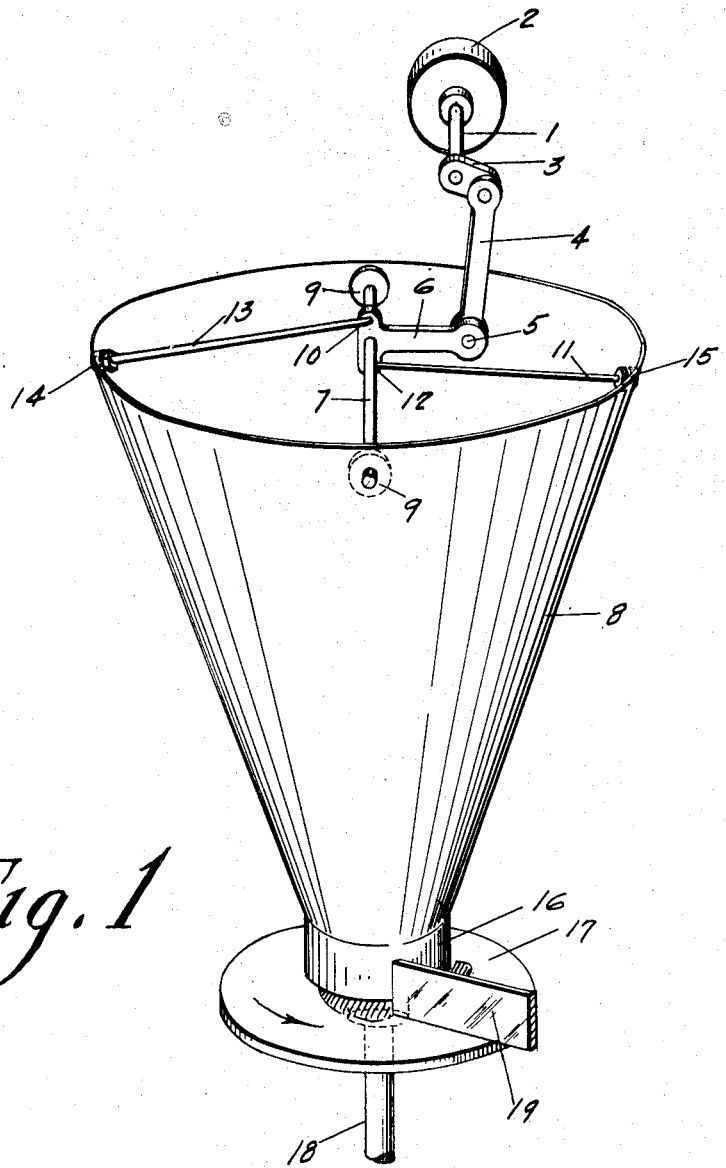
Figure 1 is a perspective view of one form of the apparatus embodying the present improvements.

Referring to Figure 1; shaft 1 is connected to a suitable rotating power source through pulley 2. Crank 3 is mounted on shaft 1 and is connected to link 4 which in turn is connected to double bell crank 6 through pin 5. Double bell crank 6 is rotatively fitted on shaft 7. Shaft 7 is rigidly mounted on external means (not shown). Hopper 8 is a semi-rigid frustrum of a cone, mounted on shaft 7 at points 9 and 9. Link 13 connects bearing 10 in double bell crank 6 to point 14 in hopper 8. Similarly, link 11 connects bearing 12 in double bell crank 6 to point 15 in hopper 8. The remaining parts numbered on Figure 1, namely; 16, 17, 18 and 19 make up the feeding and regulating mechanism, which although not new nor included in the purpose of this patent, shows how the flexible hopper may be used in conjunction with such a feed controlling member. Spout 16 is connected to hopper 8 and is supported rigidly above turntable 17. Turntable 17 is mounted on and rotated by shaft 18. Scraper 19 is also part of the feeling member.

Figure 2:
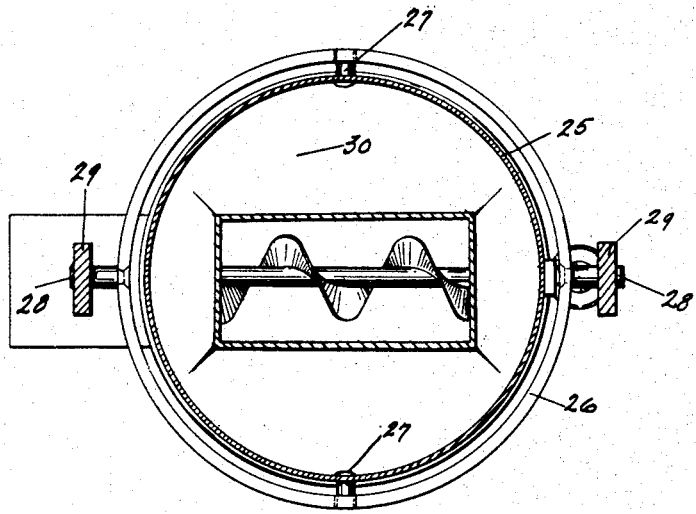
Figures 2 and 3 are views of another form of the apparatus embodying the present improvements.
Figure 3:
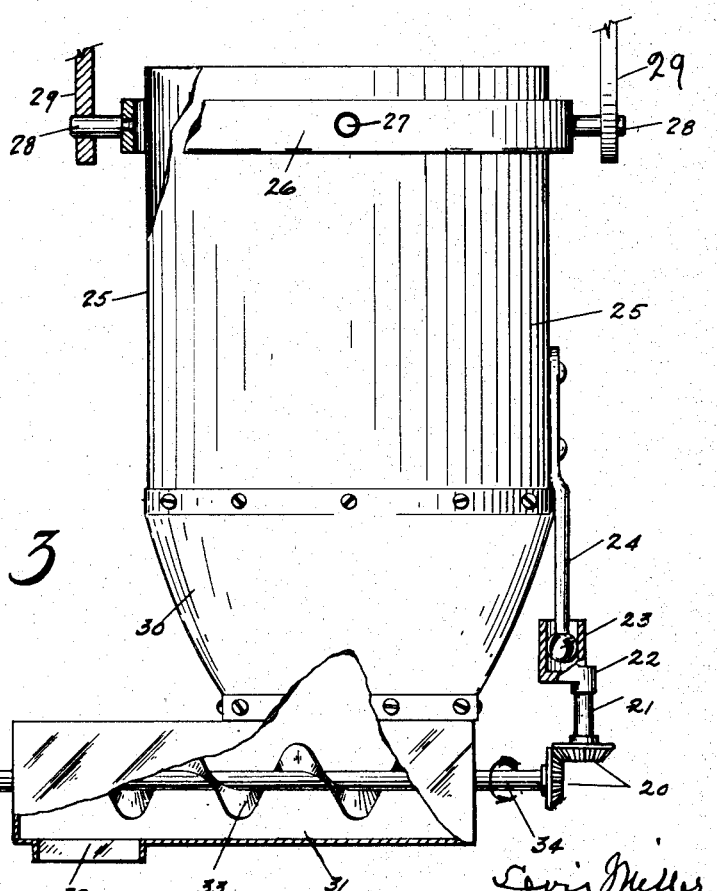

Referring to Figures 2 and 3, shaft 34 is connected to a suitable source of power through pulley 35. Shaft 21 is connected to shaft 34, through bevel gears 20. Crank 22 is mounted on shaft 21 and is fitted with a sliding ball and socket joint 23. The ball part of the joint is on the lower end of rod 24. The upper end of rod 24 is rigidly attached to hopper section 25. Hopper section 25 is rigid cylinder open top and bottom, and is mounted on a gimbal support composed of ring 26, pins 27 which are rigidly fastened to hopper section 25 and rotatably fitted in ring 26, and pins 28 which are rigidly fastened in ring 26 and rotatably fitted in bearings 29. Flexible hopper section 30 is made of rubber, fabric or other similar material and at its upper edge is fastened to hopper section 25. The remaining parts numbered on Figure 2, namely, 31, 32 and 33, compose the feeding and regulating mechanism which although not new nor included in the purpose of this patent, demonstrate how the flexible hopper may be used in conjunction with such a feed mechanism which has been known to the art for many years. Box 31 is open at the top and is connected to the lower end of hopper section 30. Screw conveyor 33 is mounted on shaft 34 and is within box 31, and is long enough to extend from beneath hopper section 30 to above hole 32 in the bottom of box 31.

Method of operation of the form shown in Figure 1 is as follows:

The material to be fed is placed in hopper 8. Shaft 1 is rotated in either direction imparting an up and down motion to pin 5 through crank 3 and link 4. Pin 5 produces a slight back and forth rotation of double bell crank 6 on shaft 7. This slight rotation of double bell crank 6 causes the opposite sides of the hopper 8 to be alternately pulled in and pushed out by links 11 and 13. This periodical deformation of the hopper sides causes every particle of the material contained therein to be agitated at all times. A flow of the contained material is readily maintained to spout 16 where it flows out on turntable 17. Turntable 17 is turned by shaft 18 in the direction indicated and as it does so the material which has flowed out on the turntable is scraped off by scraper 19.

The method of operation of the form of apparatus shown in Figures 2 and 3 is as follows:

The material to be fed is placed in the hopper consisting of sections 25 and 30. Shaft 34 is rotated in the direction indicated and crank 22 is rotated through bevel gears 20 and shaft 21. Rod 24 is then caused to describe a horizontal rotating motion which is in turn imparted to the lower end of hopper section 25. Since hopper section 25 is supported in the manner previously described, its lower end is capable of being moved in any horizontal direction. As hopper section 25 moves around its orbit the upper end of hopper section 30 follows it and therefore causes deformation of the sides of the flexible hopper section 30. Since hopper section 25 has vertical sides no arching can occur within it and further, since the contents of hopper section 30 is being constantly agitated, all arches or cakes are prevented within it and an even flow of the contained material is maintained to the box 31 below. Screw conveyor 33 being mounted on shaft 19 rotates and moves the material along until it falls through the discharge port 32. The speed of the conveyor and its carrying capacity determine the feed.

While the flexible hoppers as shown and described herein are the preferred forms, the invention is not limited to this particular form inasmuch as there are other methods of varying the contour of the hopper which can be used. The hopper can be made of fabric, rubber, or other flexible material in which relative movement of the various parts of the hopper is produced by mechanical means. It may be composed of rigid sections with flexible joints between the sections and a mechanical means for producing a relative motion between these sections. The flexible joints between the sections may be either horizontal or vertical. And further, although the preferred flexible hoppers in our description of the apparatus are shown with screw conveyor or turntable type of feeding and regulating devices, the invention is not limited to use with these two types alone.

Among the advantages of the device as developed are: The fact that the contents of the hopper being maintained in a mobile mass prevents the caking and arching which is known to be experienced in other types of feed hoppers. By reason of this thorough agitation of the material to be fed, the feeding and regulating member, regardless of its type, to which the hopper contents are delivered, will produce a more accurate feed than can be expected of hoppers of other construction. Heretofore, machines used for similar purposes have been dependent solely upon the effect produced by arms or paddles moving within the contents of the hopper. Since the sphere of influence of such arms or paddles is limited, open channels are cut through the immediately adjacent contents of the hopper leaving the other portions unmoved.

Having described our apparatus and its method of operation, we claim:

1. A device of the class described comprising a hopper made of flexible material which normally holds a predetermined shape, a pair of members connected at their outer ends with substantially diametrically opposite points of the hopper, and means connected with the inner ends of said members for actuating the same to alternately contract and expand the wall of the hopper diametrically.

2. A device of the class described comprising a hopper made of flexible material which normally holds a predetermined shape and having a feed end and a discharge end, a pair of members connected at their outer ends with substantially diametrically opposite points of the feed end of the hopper, and means connected with the inner ends of said members for actuating the same to alternately contract and expand the wall of the hopper.

3. A feeding device of the class described comprising a hopper made of flexible material which normally holds a predetermined shape, a pair of elements connected to substantially diametrically opposite points of the hopper, and means for connecting the inner ends of said members together whereby they may be reciprocated in opposite directions to alternately move opposite wall portions of the hopper toward and from each other.

4. A feeding device of the class described comprising a hopper made of flexible material which normally holds a predetermined shape, reciprocatory members connected to substantially diametrically opposite points of the hopper, and means for actuating said reciprocatory members whereby the opposite wall portions of the hopper are alternately drawn together and moved apart.

5. A feeding device of the class described including a hopper having flexible side walls which normally maintain a predetermined shape, means connected with substantially diametrically opposite points of the said flexible side walls for effecting the flexing thereof and means for actuating said first named means to cause the flexible side walls of the hopper to move alternately toward and from each other.

6. A device of the class described comprising a hopper whose side walls are made of bendable material whereby said walls may be flexed toward and from the axis of the hopper, power actuated means, and means operatively connected with said power actuated means and the said bendable side walls of the hopper whereby the said power actuated means will gradually and continuously move said flexible side wall portions toward and from each other to assist in the extrusion of the material from the hopper.

7. A mechanical feeder including a storage hopper made of deformable material and having such conformation as to normally restrain the flow of material therefrom, said hopper also having a receiving end and a discharge end and mechanical means continuously operatively connected with the feed end of the hopper for continuously and synchronously causing the deformation of said hopper to assist in the extrusion of material from the discharge end thereof.

8. A mechanical feeder including a feed hopper composed of flexible material which normally holds a predetermined shape, means connected to the hopper above its discharge outlet for gradually and continuously changing the contour of the hopper, said means consisting of means connected to the hopper, and actuating mechanism connected to said means.

9. A feeding device of the class described, including a storage hopper made of flexible material and having such conformation as to normally restrain the flow of material therefrom, power actuated means attached directly to the hopper, which means is normally in operative engagement and causes a positively controlled movement thereof at the point of attachment to assist in the discharge of material contained in said hopper.

10. A feeding device of the class described, including a storage hopper made of pliable material and having such conformation as to normally restrain the flow of material therefrom, power actuated means and means directly attached to the hopper at the point of maximum movement of the wall of the hopper, said power actuated means being in continuously operative engagement with said hopper whereby said power actuated means will deform the hopper to assist in the discharge of material contained therein.

11. A mechanical feeder including a feed hopper having such conformation as to normally restrain the flow of material therefrom and made of flexible material and power actuated flexing means fixedly connected with the hopper which cause the hopper to be gradually flexed in undamped oscillations, to assist in the extrusion of material from the hopper.

12. A mechanical feeder including a feed hopper having such conformation as to normally restrain the flow of material therefrom and made of flexible material and power actuated means directly and fixedly connected with the hopper for effecting a positively controlled movement for deforming the hopper with undamped movement throughout the cycle of movement to assist in the extrusion of material from said hopper.

13. A mechanical feeder including a feed hopper having such conformation as to normally restrain the flow of material therefrom and made of flexible material, continuously operating means directly connected therewith for deforming it and for causing it to assume the same form at any given point in successive cycles of movement to assist in the extrusion of material from the hopper.

14. A mechanical feeder including a feed hopper having such conformation as to normally restrain the flow of material therefrom and made of flexible material and continuously operating means directly connected therewith for moving one or more portions of the hopper relatively to adjacent portion or portions thereof in undamped movements in a cyclic manner thereby causing said feed hopper to assume the same form at any given point in successive cycles of movement to assist in the extrusion of material from said hopper.

LEVIS MILLER BOOTH.
GEORGE MARTIN BOOTH.